(12) United States Patent
Smirnov et al.

(10) Patent No.: US 7,932,654 B2
(45) Date of Patent: Apr. 26, 2011

(54) MOTOR

(75) Inventors: Viatcheslav Smirnov, Suwon-si (KR);
Yeol Choi, Kwangmyeong-si (KR);
Young-Sun Yoo, Suwon-si (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 0 days.

(21) Appl. No.: 12/634,175

(22) Filed: Dec. 9, 2009

(65) Prior Publication Data

US 2011/0006630 A1    Jan. 13, 2011

(30) Foreign Application Priority Data

Jul. 10, 2009  (KR) .................. 10-2009-0063088

(51) Int. Cl.
*H02K 7/08* (2006.01)
*H02K 7/00* (2006.01)
*H02K 7/09* (2006.01)
*H02K 21/12* (2006.01)
*B41J 2/435* (2006.01)
*F16C 32/06* (2006.01)

(52) U.S. Cl. ... 310/90; 310/67 R; 310/90.5; 310/156.12; 347/261; 384/100

(58) Field of Classification Search .............. 310/67 R, 310/90, 90.5, 156.12; 101/375; 347/261; 384/100

See application file for complete search history.

(56) References Cited

U.S. PATENT DOCUMENTS

| 6,040,649 A * | 3/2000 | Horng | 310/91 |
| 6,339,273 B1 * | 1/2002 | Higuchi | 310/91 |
| 2002/0037116 A1 * | 3/2002 | Nishida et al. | 384/100 |

FOREIGN PATENT DOCUMENTS

| JP | 7-59326 | 3/1995 |
| JP | 2000-184676 | 6/2000 |

OTHER PUBLICATIONS

Korean Office Action, w/ partial English translation thereof, issued in Korean Patent Application No. KR 10-2009-0063088 dated Dec. 7, 2010.

* cited by examiner

*Primary Examiner* — Quyen Leung
*Assistant Examiner* — Jose A Gonzalez Quinones
(74) *Attorney, Agent, or Firm* — McDermott Will & Emery LLP

(57) ABSTRACT

A motor is disclosed. In accordance with an embodiment of the present invention, the motor includes a stator and a rotor, which is supported by the stator such that the rotor rotates. Here, the rotor includes a rotational axis, which is supported by the stator such that the rotational axis rotates, a rotating body, which rotates together with the rotational axis, and a hub, which has a ring-shaped body and a protruding part. Here, the ring-shaped body is interposed between the rotational axis and the rotating body, and the protruding part extends an outer circumferential surface of the ring-shaped body coupled to the rotating body. Thus, the motor can improve the coupling strength between the rotational axis and the rotating body, securing the rotating rotor's stability.

6 Claims, 7 Drawing Sheets

US 7,932,654 B2

MOTOR

CROSS-REFERENCE TO RELATED APPLICATIONS

This application claims the benefit of Korean Patent Application No. 10-2009-0063088, filed with the Korean Intellectual Property Office on Jul. 10, 2009, the disclosure of which is incorporated herein by reference in its entirety.

BACKGROUND

1. Technical Field

The present invention relates to a motor.

2. Description of the Related Art

Spindle motors are commonly used in electronic products, for example, computer drives, which require an accurately-rotating devices. Such spindle motors are extremely promising because the spindle motors can be rotated at a high speed with less power and can be readily controlled with high precision.

A typical spindle motor is constituted by a rotating rotor and a stator, which supports the rotating movement of the rotor, and such rotor is typically constituted by a rotational axis and a rotating body coupled to the rotational axis.

One of the drawbacks of conventional motors in step with the trends towards a thinner motor is that the rotational axis and the rotating body are coupled in a smaller area, thereby lowering the rotor's stability. In other words, as the motors become thinner, the length of the rotational axis coupled to the rotating body also becomes shorter, reducing the surface area of the rotational axis supporting the rotating body. As a result, the coupling strength between the rotating body and the rotational axis becomes weaker, and thus the resistance against vibrations occurred when the rotor rotates also becomes weaker, lowering the rotor's stability.

SUMMARY

The present invention provides a motor that functions with reliable stability when the rotor rotates.

An aspect of the present invention provides a motor that includes a stator and a rotor, which is supported by the stator such that the rotor rotates. Here, the rotor includes a rotational axis, which is supported by the stator such that the rotational axis rotates, a rotating body, which rotates together with the rotational axis, and a hub, which has a ring-shaped body and a protruding part. Here, the ring-shaped body is interposed between the rotational axis and the rotating body, and the protruding part extends an outer circumferential surface of the ring-shaped body coupled to the rotating body.

The protruding part can be protruded towards the stator.

The rotating body can include a supporting flange, which supports the protruding part.

The hub can further include a wedge part, which is coupled to the rotational axis.

The wedge part can be formed along an edge of an inner circumferential surface of the hub, and the rotational axis can include a coupling flange shaped to correspond to the wedge part.

The hub can have a fluid indentation formed in one surface thereof facing the stator.

The fluid indentation can be tilted towards an outer surface of the hub.

The fluid indentation can have a triangular cross-section having one slope tilted towards the outer surface of the hub.

Additional aspects and advantages of the present invention will be set forth in part in the description which follows, and in part will be obvious from the description, or may be learned by practice of the invention.

DETAILED DESCRIPTION

A motor according to a certain embodiment of the present invention will be described below in more detail with reference to the accompanying drawings.

Figure 1:
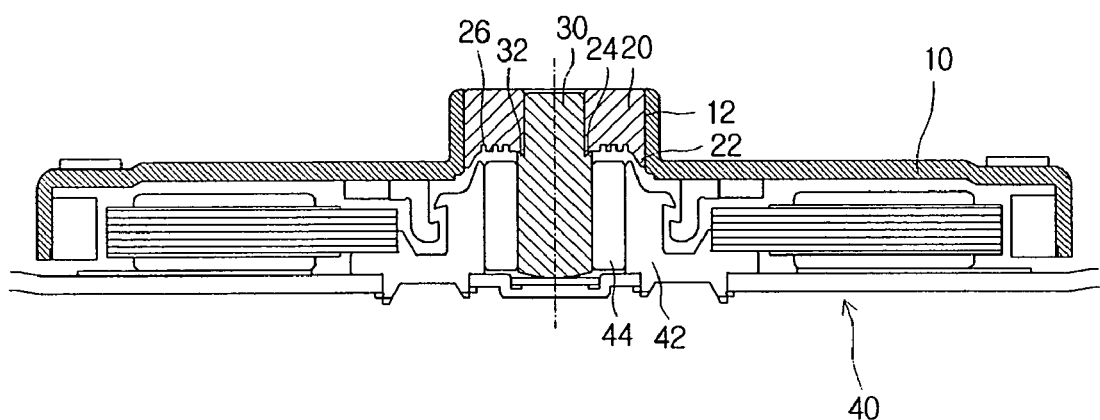
FIG. 1 is a cross-sectional view of a motor in accordance with an embodiment of the present invention.
Figure 2:
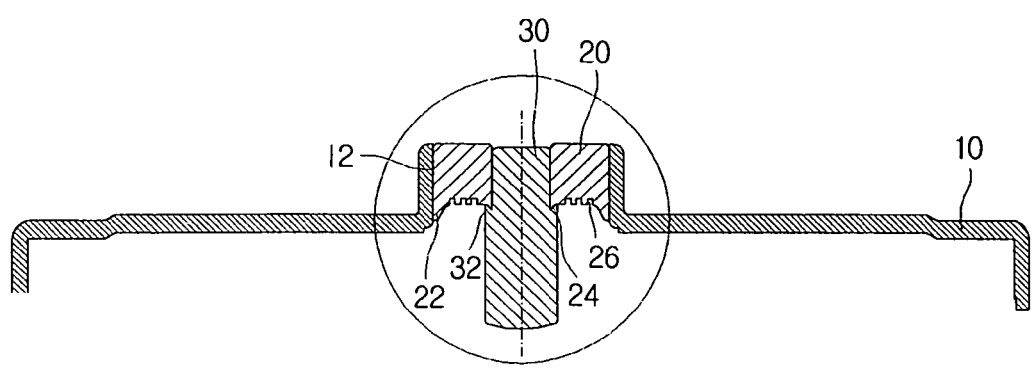
FIG. 2 is a cross-sectional view of a rotor in a motor in accordance with an embodiment of the present invention.

FIG. 1 is a cross-sectional view of a motor according to an embodiment of the present invention, and FIG. 2 is a cross-sectional view of a rotor in a motor according to an embodiment of the present invention.

A motor according to an embodiment of the present invention includes a rotational axis 30, a rotating body 10, a rotor, which includes a hub 20, and a stator 40, which supports and rotates the rotor.

A typical motor is generally constituted by a rotor and a stator, which supports the rotational movement of the rotor. For example, the rotor may include a shaft and a rotor case, and the stator may include a housing, which supports and rotates the shaft, and an electromagnet.

In the motor according to an embodiment of the present invention, as illustrated in FIG. 1, a rotational axis 30, a rotor case and a hub 20 are included in the rotor.

The rotational axis 30 is an axis of the rotating rotor and a part that supports the entire rotor when the rotor rotates. For this, the rotational axis 30 is supported by the stator 40 in such a way that the rotational axis 30 can rotate.

A portion of the rotational axis 30 of the present embodiment is inserted into and supported by a housing 42 of the stator 40. A bearing 44 is interposed between the rotational axis 30 and the housing 42 to enable the rotational axis 30 to rotate.

The rotating body 10 rotates together with the rotational axis 30 as a single unit with the rotational axis 30. For this, the rotating body 10 is connected to the rotational axis 30 by being coupled to the hub 20, which will be described later.

The rotating body 10 of the present embodiment functions as a rotor case and has a through-hole 12 formed in the middle such that the rotating body 10 can be coupled with the hub 20.

The hub 20 is a part that makes the rotational axis 30 and the rotating body 10 a single unit, and can have a ring-shaped body that is interposed between the rotational axis 30 and the rotating body 10. Since the hub 20 can be formed as thick as how much the hub can be coupled with the rotational axis 30, the hub 20 can be firmly coupled to the rotational axis 30 to widen the diameter of an area in which the rotational axis 30 is coupled.

Particularly, the hub 20 of the present embodiment has a protruding part 22, which extends the outer surface of the body being coupled to the rotating body 10, so as to increase the coupling strength between the hub 20 and the rotating body 10. That is, the protruding part 22 can be formed along the outer circumference of the hub 20 such that the surface area of the outer surface of the hub 20 being coupled to the rotating body 10 can be enlarged.

With this arrangement, the rotational axis 30 can be coupled to the rotating body 10 with a stronger coupling strength through the use of the hub 20, compared directly coupling the rotational axis 30 to the rotating body 10. Thus, the resistance against vibrations occurred when the rotor rotates can be increased, improving the rotating rotor's stability.

Since the protruding part 22 is protruded towards the stator 40, the coupling area between the hub 20 and the rotating body 10 can be maximized even in a thin motor.

Figure 3:
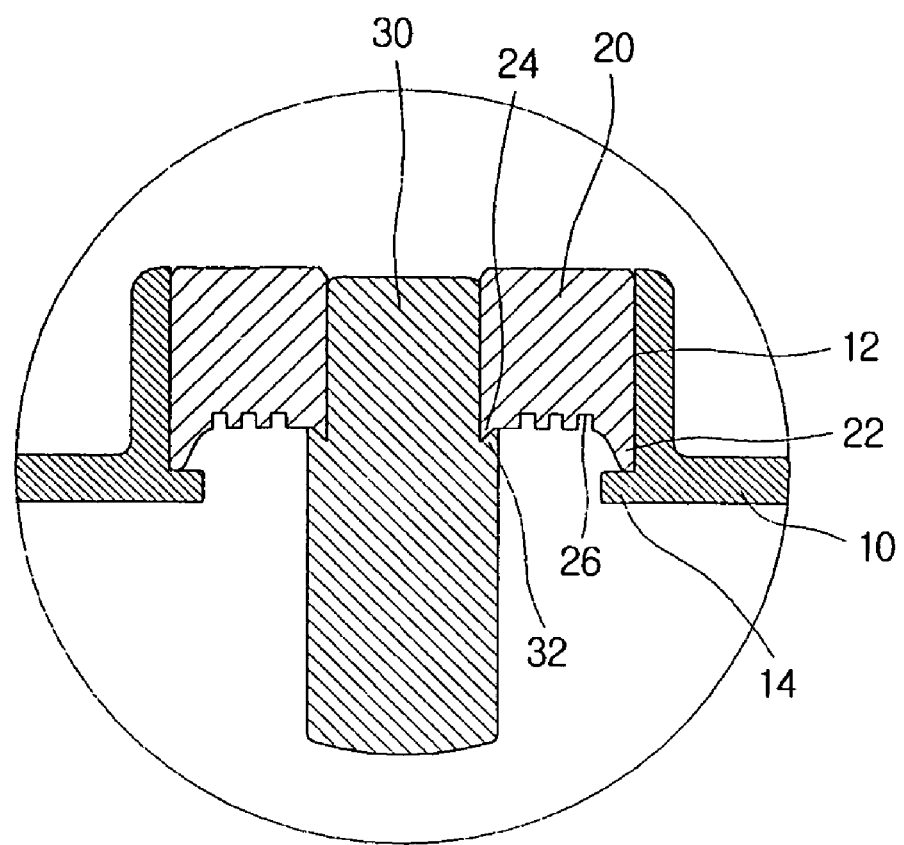
FIGS. 3 to 7 are cross-sectional views illustrating a hub of a motor in accordance with an embodiment of the present invention.

To further increase the coupling strength between the hub 20 and the rotating body 10, a supporting flange 14, which supports the protruding part 22, can be formed in the rotating body 10, as illustrated in FIG. 3.

To further secure the coupling between the hub 20 and the rotational axis 30, the hub 20 can further include a wedge part 24 that is coupled to the rotational axis 30. Specifically, the wedge part 24 of the present embodiment is formed along the edge of the inner circumferential surface of the hub 20 being coupled to the rotational axis 30. Furthermore, a coupling flange 32, which is shaped to correspond to the wedge part 24, can be formed in the rotational axis 30 such that the wedge part 24 can be coupled to the rotational axis 30.

A fluid indentation 26 can be also formed in one surface, facing the stator 40, of the hub 20 in order to reduce air resistance or to prevent oil droplets from scattering when the rotor rotates.

FIGS. 4 to 7 are cross-sectional views illustrating a fluid indentation 26 of the hub 20 according to an embodiment of the present invention.

Figure 4:
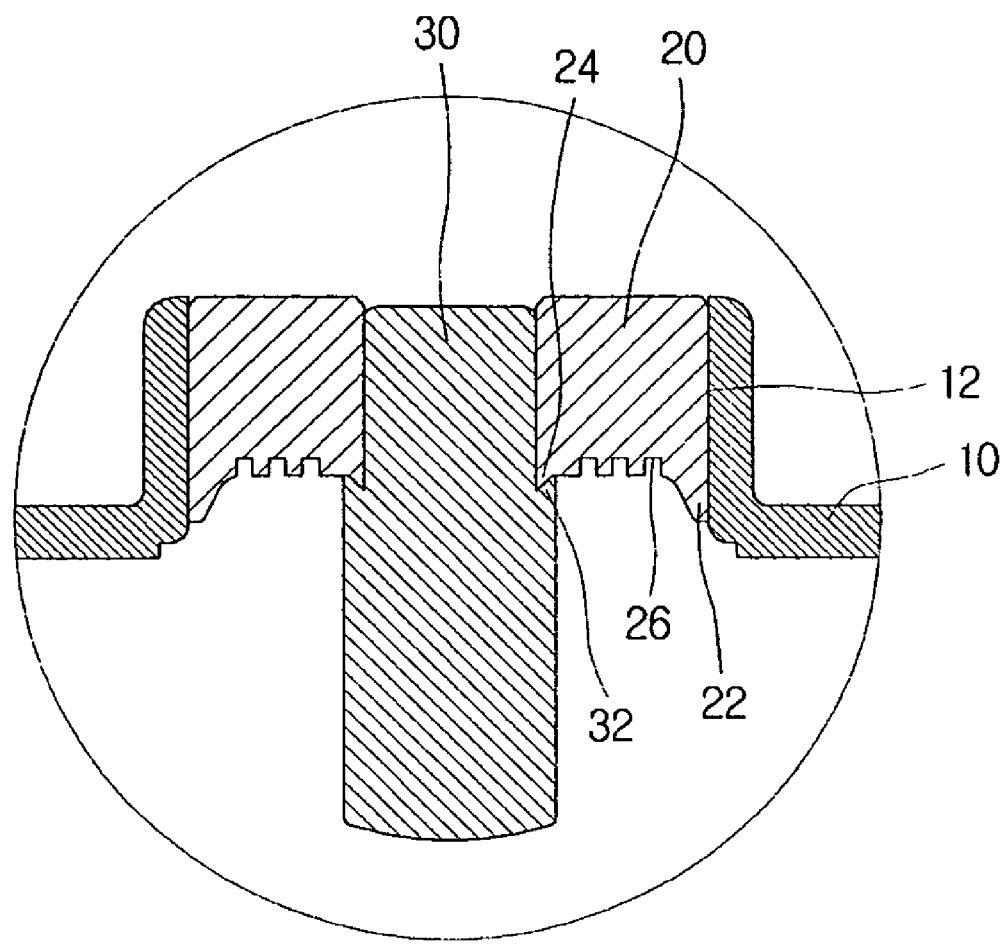
Figure 5:
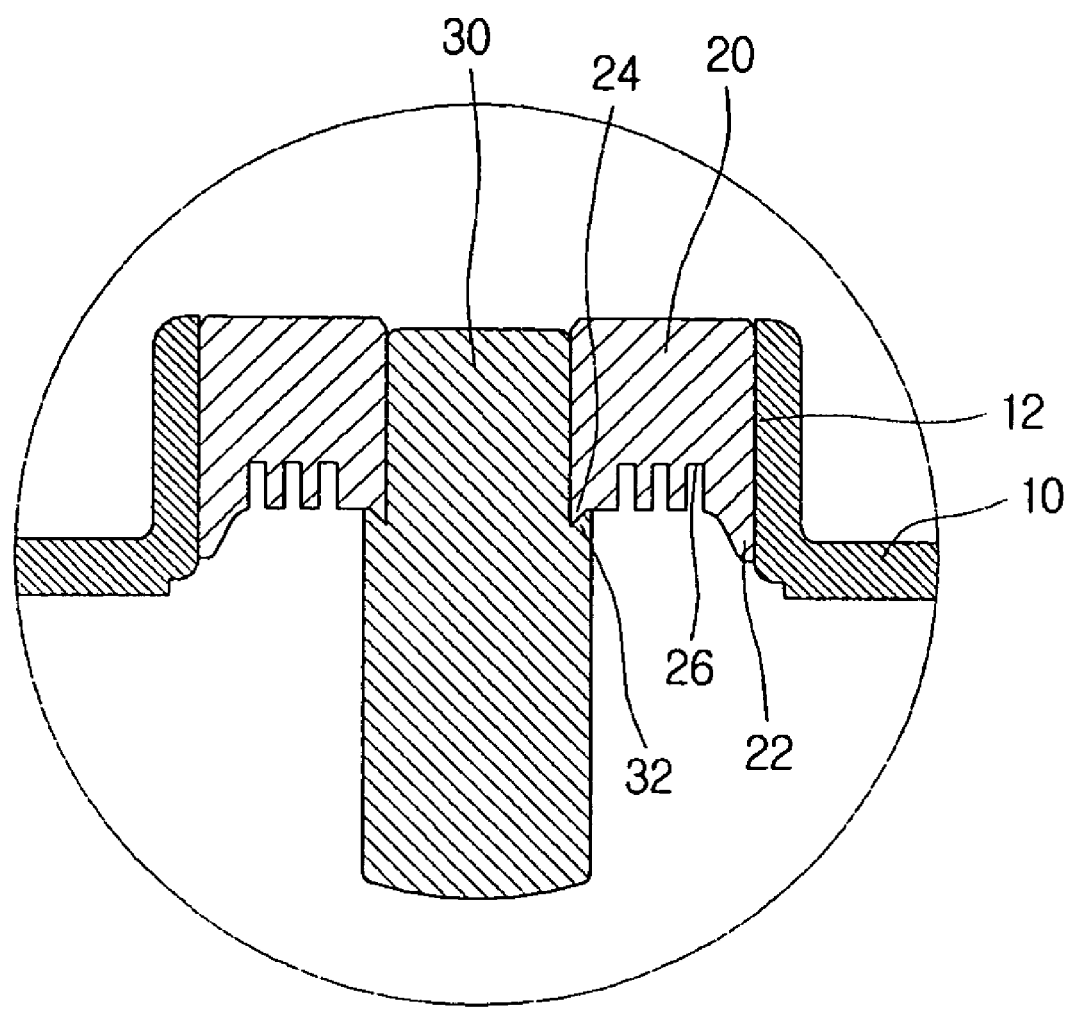

As the rotor rotates faster, the rotating body 10 encounters greater air resistance. Particularly, when a diffusion effect of air flow occurs on the surface of the rotating body 10, it may significantly increase the air resistance of the rotating body 10, thus violently vibrating the rotor. To prevent such diffusion effect of air flow, a plurality of fluid indentations 26 can be formed in the hub 20 so as to create a small turbulent flow, as illustrated in FIG. 4. The small turbulent flow formed in the fluid indentations 26 can make the air flow smooth, i.e., the flow is laminar, so that the diffusion effect of air flow can be prevented from occurring on the surface of the rotational body 10. Here, as illustrated in FIGS. 4 and 5, the width and depth of the fluid indentations 26 can be changed according the design conditions, such as the operating revolutions per minute of the motor and the diameter of the rotating body 10.

Figure 6:
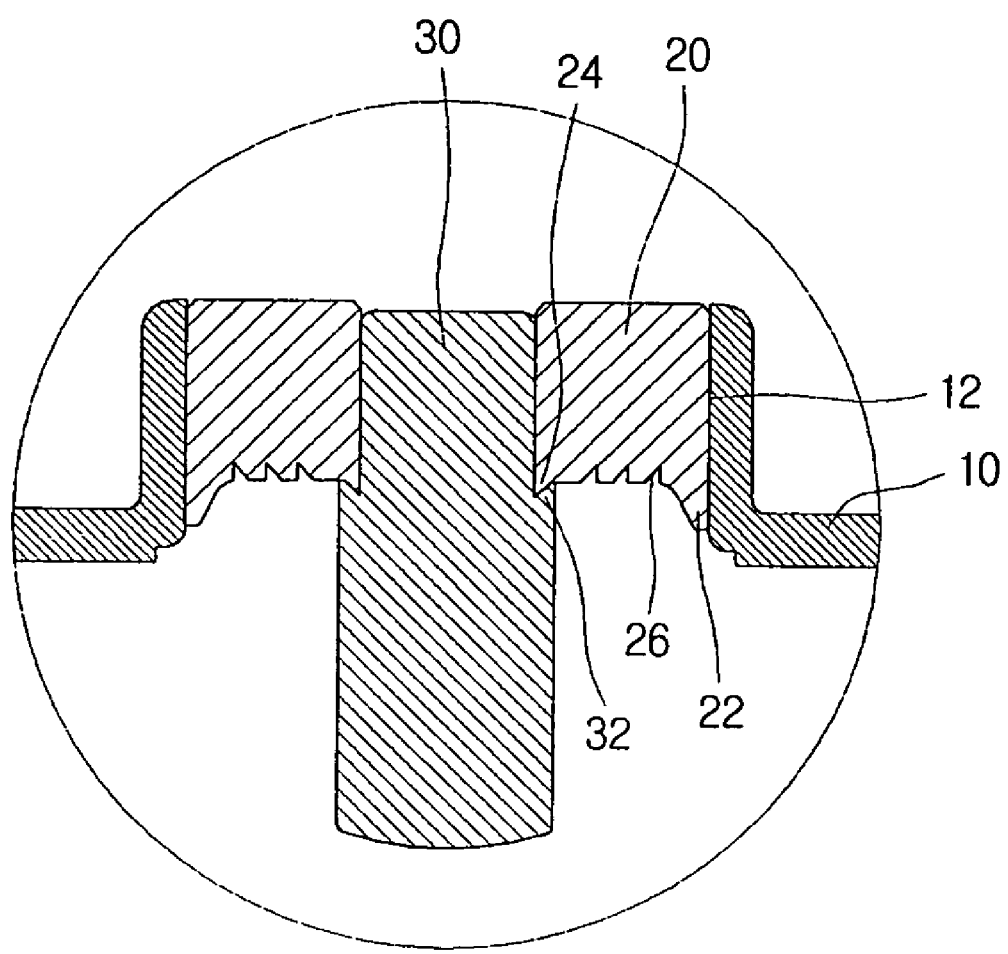

Furthermore, the fluid indentations 26 can be used for preventing the scattering of oil droplets. In this case, as illustrated in FIG. 6, the fluid indentations 26 can be tilted toward the outer surface of the hub 20. Specifically, the hub 20 of the present embodiment has a fluid indentation 26 with a triangular cross-section having one slope tilted towards the outer surface of the hub 20.

Figure 7:
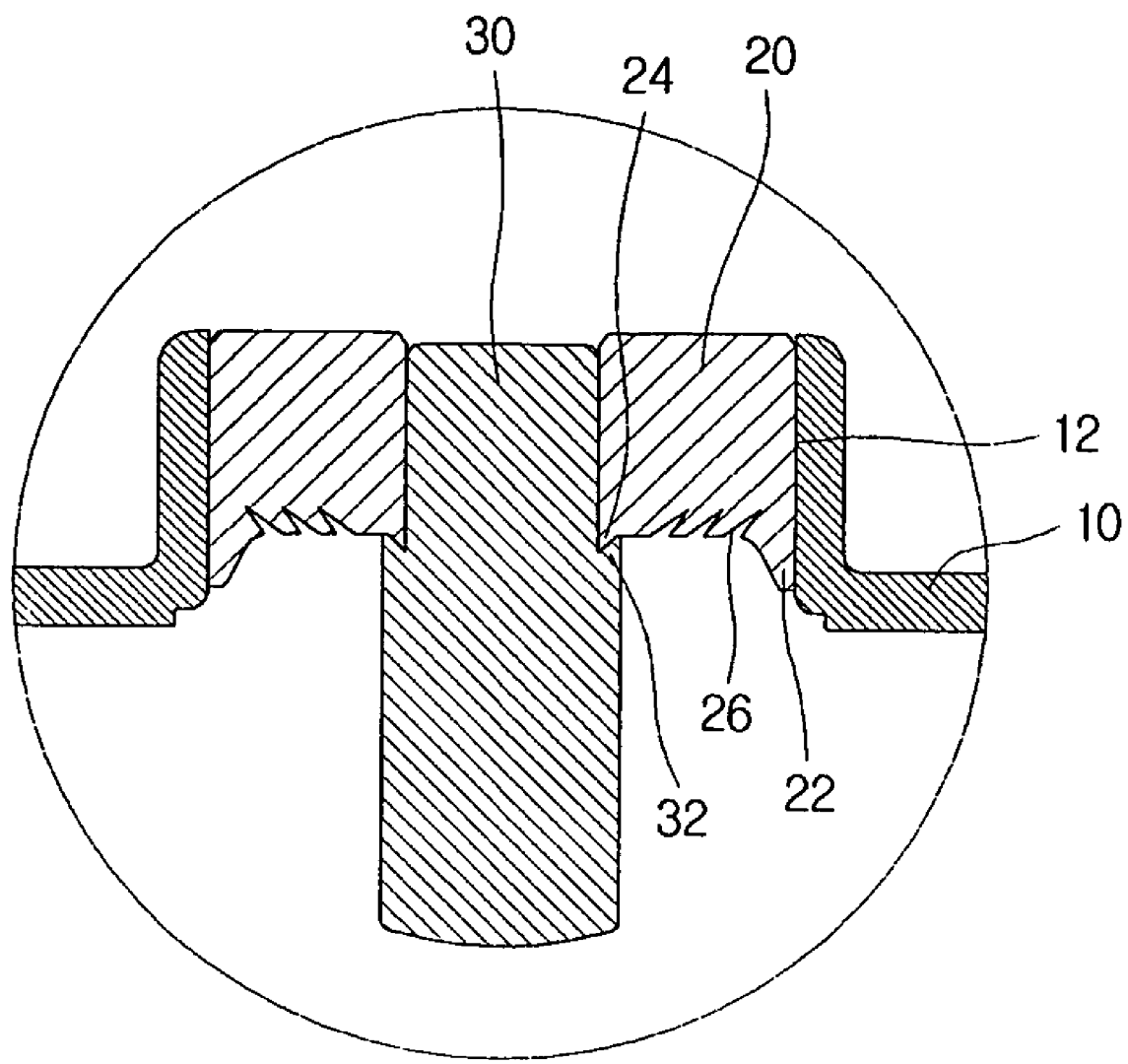

With this arrangement, oil moving from the rotational center to the outside by the centrifugal force created from the rotating rotor can flow into the tilted fluid indentations 26. Then, the oil loses its kinetic energy, and oil droplets can fall down from the fluid indentations 26. Thus, when the rotor rotates, the oil inside the rotating body 10 can be prevented from escaping and scattering to the outside of the rotating body 10. Here, as illustrated in FIG. 7, the fluid indentations 26 can also have a triangular cross-section including two slopes tilted towards the outer surface of the hub 20 so that the oil scattering can be further prevented from occurring.

While the spirit of the present invention has been described in detail with reference to particular embodiments, the embodiments are for illustrative purposes only and shall not limit the present invention. It is to be appreciated that those skilled in the art can change or modify the embodiment without departing from the scope and spirit of the present invention.

As such, many embodiments other than those set forth above can be found in the appended claims.

What is claimed is:

1. A motor comprising:
   a stator; and
   a rotor supported by the stator such that the rotor rotates, wherein the rotor comprises:
   a rotational axis supported by the stator such that the rotational axis rotates;
   a rotating body configured to rotate together with the rotational axis; and
   a hub having a ring-shaped body and a protruding part, the ring-shaped body being interposed between the rotational axis and the rotating body, the protruding part extending an outer circumferential surface of the ring-shaped body coupled to the rotating body,
   wherein the hub has a fluid indentation that is formed in one surface thereof facing the stator and tilts towards an outer surface of the hub.

2. The motor of claim 1, wherein the protruding part is protruded towards the stator.

3. The motor of claim 2, wherein the rotating body comprises a supporting flange configured to support the protruding part.

4. The motor of claim 1, wherein the hub further comprises a wedge part coupled to the rotational axis.

5. The motor of claim 3, wherein the wedge part is formed along an edge of an inner circumferential surface of the hub, and wherein the rotational axis comprises a coupling flange shaped to correspond to the wedge part.

6. The motor of claim 1, wherein the fluid indentation has a triangular cross-section having one slope tilted towards the outer surface of the hub.

* * * * *